United States Patent
Axe et al.

(10) Patent No.: US 7,485,172 B2
(45) Date of Patent: Feb. 3, 2009

(54) OXYGEN SUPPLY SYSTEM

(75) Inventors: Richard James Axe, Yeovil (GB);
Richard Grant Hunt, Yeovil (GB)

(73) Assignee: Honeywell Normalair-Garrett (Holdings) Limited (GB)

( * ) Notice: Subject to any disclaimer, the term of this patent is extended or adjusted under 35 U.S.C. 154(b) by 558 days.

(21) Appl. No.: 10/537,524

(22) PCT Filed: Dec. 4, 2003

(86) PCT No.: PCT/GB03/05304

§ 371 (c)(1),
(2), (4) Date: Nov. 7, 2005

(87) PCT Pub. No.: WO2004/050479

PCT Pub. Date: Jun. 17, 2004

(65) Prior Publication Data
US 2006/0144233 A1    Jul. 6, 2006

(30) Foreign Application Priority Data
Dec. 4, 2002    (GB) ................... 0228253.1

(51) Int. Cl.
*B01D 53/02* (2006.01)
(52) U.S. Cl. .................. 95/14; 95/18; 95/39; 95/96
(58) Field of Classification Search ............ 95/14, 95/18, 39, 96, 115; 96/112, 126, 127, 128
See application file for complete search history.

(56) References Cited

U.S. PATENT DOCUMENTS

| | | |
|---|---|---|
| 4,378,920 A | 4/1983 | Runnels et al. |
| 4,681,602 A | 7/1987 | Glenn et al. |
| 4,793,832 A * | 12/1988 | Veltman et al. ............. 95/14 |
| 5,373,707 A | 12/1994 | Lior et al. |
| 7,048,231 B2 * | 5/2006 | Jones .................. 244/135 R |

* cited by examiner

*Primary Examiner*—Robert A Hopkins
(74) *Attorney, Agent, or Firm*—Eckert Seamans Cherin & Mellott; Carol A. Marmo, Esq.

(57) ABSTRACT

A method of providing gas to a system which separates from a pressurized supply gas, product gas, includes conditioning the supply gas by both cooling and drying the supply gas.

18 Claims, 1 Drawing Sheet

OXYGEN SUPPLY SYSTEM

DESCRIPTION OF INVENTION

Figure 1:
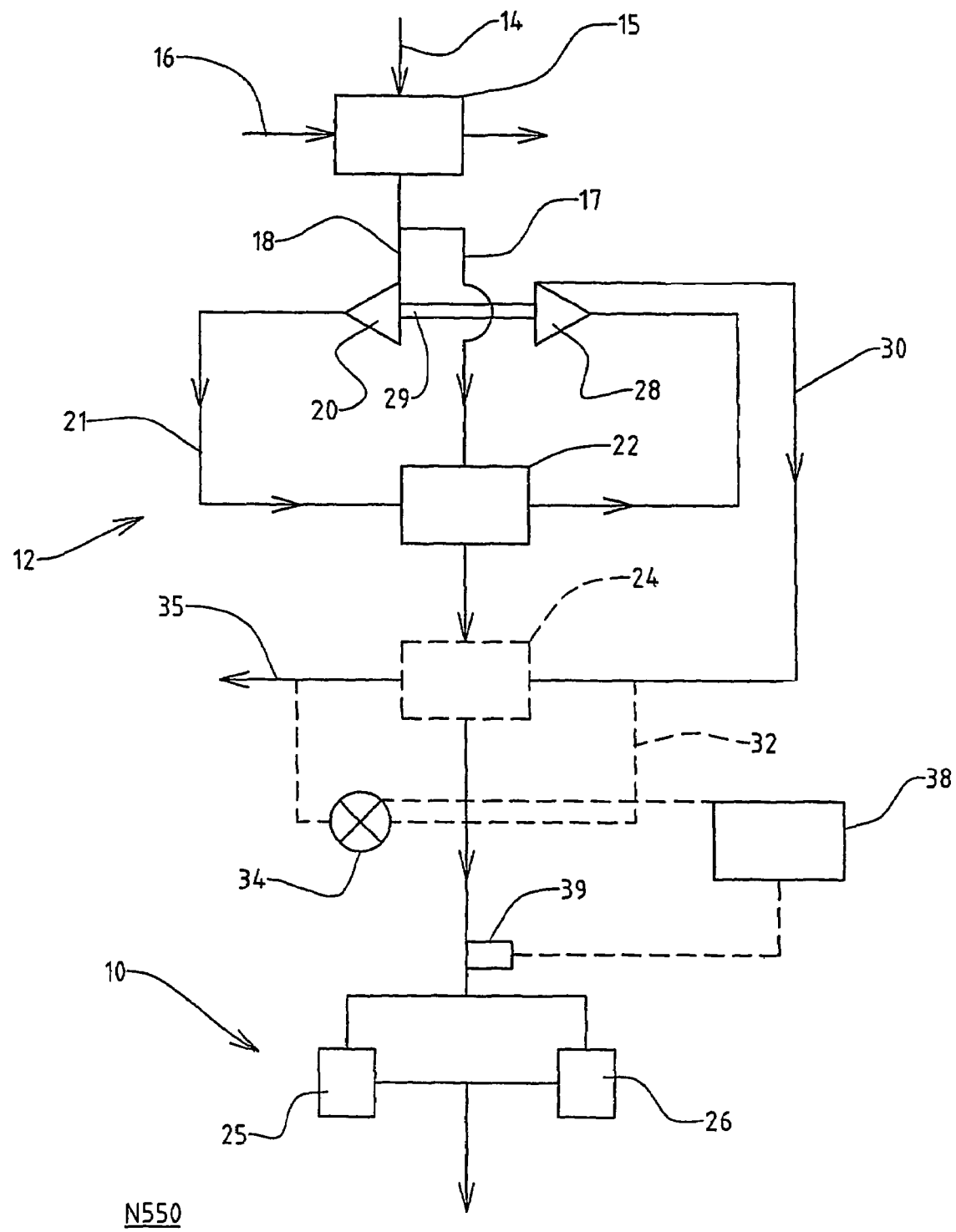

This invention relates to a method of providing gas to a system which separates from a gas supply, product gas.

Systems are known for separating from a pressurised gas supply, such as compressed air, product gas such as oxygen enriched gas for breathing. In one exemplary arrangement, the pressurised gas supply is hot and compressed air bled from a gas turbine engine, and the separating system includes at least one, usually a plurality of, molecular sieve beds which include molecular sieve bed material which in a first mode of operation, adsorbs from the compressed air supply, non-product gas, and in a second mode of operation when the sieve bed is opened to ambient pressures, the adsorbed non-product gas is purged from the molecular sieve bed material. Thus oxygen enriched product gas is separated out of the supply air. Such a system is known as an OBOG (on-board oxygen generating) system.

OBOGS are used in aircraft to produce oxygen enriched gas for breathing purposes.

For an aircraft, weight is a critical factor for any installed system. The provision of a such system which is able to provide a breathable gas avoids the need to carry large volumes of compressed breathable gas, in heavy containers. However, OBOG efficiency depends on many factors, one of which is the temperature of the air supply fed to it, and another of which is the amount of moisture in the air supply. An OBOG operates most efficiently to adsorb non-product gas, when the air supplied to it is within a certain temperature range, and because moisture in the air supply tends to be adsorbed by the molecular sieve bed material, overly wet supply air detracts from the efficiency of operation of the OBOG too.

It is known in an aircraft to cool the hot compressed air supply to a relatively small extent prior to feeding the air supply to the separation system, utilising ambient air which is used as a coolant in a heat exchanger, the ambient air typically being so-called ram air which flows through the heat exchanger by virtue of the movement of the aircraft through the air, although on the ground, such coolant ambient air may be introduced by a fan.

Another consideration for an aircraft, particularly a military aircraft is the temperature of exhausted non-product gas, but even for a civil aircraft the exhaustion of hot non-product gas is a waste of energy.

According to one aspect of the invention we provide a method of providing gas to a system which separates from a pressurised supply gas, product gas the method including conditioning the supply gas by both cooling and drying the gas.

Thus utilising the method of the invention, problems of existing systems, particularly OBOG type systems, are at least reduced in that the temperature of the supply gas fed to the OBOG(S) may be controlled to be within a temperature range at which the OBOG(S) operate(s) most efficiently, and the wet supply gas is dried. Although to condition the supply gas will involve the provision of conditioning apparatus which will contribute weight, this will be counterbalanced as a smaller, lighter gas separation system than otherwise would be required, may be provided.

In one example, the method includes cooling the supply gas sufficiently to remove moisture from the supply gas by condensation. Thus the method of the invention may include separating a gas supply into system gas, and supply gas, the supply gas being fed to a condenser where the supply gas is cooled by a coolant and moisture is removed from the supply gas to dry the supply gas, and passing the system gas to a cooling device where the system gas is cooled, and then using the cooled system gas as the coolant in the condenser.

The cooling device conveniently is a turbine over which the system gas is expanded. Where the gas supply is hot highly pressurised gas, such as air bled from a gas turbine engine, energy recovered from the hot pressurised gas by the turbine may be utilised by the conditioning apparatus, for example, to drive a compressor to compress and warm the system gas after the system gas has been used as a coolant in the condenser.

The supply gas, after drying, may be further conditioned in a heat exchanger to bring the temperature of the supply gas to within an optimal operating range for the downstream separating system. Such further conditioning may include warming the supply gas in the heat exchanger with a warming fluid, for example with the compressed system gas from the compressor driven by the turbine, where provided.

The method may include sensing the temperature of the supply gas downstream of the heat exchanger, to provide an input to a controller which opens and closes a valve to control the flow of the warming fluid to the heat exchanger, so that the temperature of the supply gas supplied to the separating system may be controlled.

The method may thus include compressing the expanded system gas after using the expanded system gas as a coolant in the condenser, warming the supply gas after drying, in the heat exchanger with the compressed system gas, and then exhausting the system gas. In this way, there is a minimal wastage of energy in the gas supply and the temperature of the exhausted air need not be significantly above ambient temperature.

The method of the invention may include utilising ambient air as a coolant in a pre-cooler heat exchanger, to cool the gas supply prior to conditioning the supply gas.

According to a second aspect of the invention we provide in combination a system which separates from supply gas, product gas, and a conditioning apparatus to cool the supply gas for use in the separating system.

The system of the second aspect of the invention may have any of the features of the apparatus described for use in the method of the first aspect of the invention.

According to a third aspect of the invention we provide an aircraft having a combination of a system which separates from supply gas, product gas, and a conditioning apparatus to cool the supply gas for use in the separating system, according to the second aspect of the invention.

The invention will now be described with reference to the accompanying drawing which an exemplary illustrative diagram of a combination of a system which separates from supply gas, product gas, and a conditioning apparatus to cool the supply gas for use in the separating system, operable by the method of the invention.

Referring to the drawing there is shown a combination of a system 10 for separating from a supply gas, product gas, and a conditioning apparatus 12 for use in an aircraft.

A pressurised gas supply 14 is provided, which in this example is hot compressed air bled from a gas turbine engine of the aircraft. This is pre-cooled in a pre-cooler heat exchanger 15 by a coolant which is ram air 16 which passes through the pre-cooler heat exchanger 15 due to the movement of the aircraft through the air and/or by the operation of a fan. The hot compressed air supply 14 is thus cooled to some extent, but generally not sufficiently for optimal use in the gas separation system 10 downstream.

Thus the pre-cooled but still hot and compressed air is then divided to provide supply air along a supply duct 17, which supply air is fed to the conditioning apparatus 12, and system air which is led along a system air duct 18.

The system air in duct 18 is fed to a turbine 20 over which the system air is expanded substantially to cool the system air. The cooled system air is then fed via a duct 21, to a condenser 22 where the cooled system air is used as a coolant to cool the supply air from duct 17 and thus to cause water present in the supply air, to be condensed out of the supply air, so that the supply air is dried as well as cooled.

Although not shown, a downstream water separator may additionally be provided to enable condensed water to be removed from the supply air. The cooled supply air is then fed, via an optional further heat exchanger 24 to the product gas separating system 10, which in this example includes a plurality of OBOGS 25, 26 (only two of which are shown for illustrative purposes) which in use, separate from the supply air, oxygen enriched product gas for use in a downstream breathing system by crew/passengers of the aircraft.

The system air which was used as a coolant in the condenser 22, is fed subsequently to a compressor 28, which for maximum efficiency is, in this example, carried on a common shaft 29 with the turbine 20, so that energy recovered from the hot compressed supply air is used to drive the compressor 28. Thus the system air is heated by being compressed before being fed into a duct 30.

If after drying the supply air in the condenser 22, the temperature of the air is below the temperature range in which the OBOGS optimally operate, the temperature of the supply air may be raised in the optional further heat exchanger 24, by using the compressed and thus heated system air from duct 30 to warm the supply air. In order to ensure that the temperature of the supply air is not overly raised in the heat exchanger 24, and is raised to bring the temperature of the supply air to within the optimal temperature range for the OBOGS, a by-pass line 32 may be provided for the heated compressed system air, so that the system air or at least a proportion of it, may be exhausted to ambient at 35, without passing through the optional further heat exchanger 24.

The flow of system air along the by-pass line 32 is controlled by a valve 34 which is an electrically operated valve, operated by a controller 38 in response to an input from a temperature sensor 39 which is positioned to sense the temperature of the conditioned supply air just prior to the supply air passing into the separating system 10. Thus the valve 34 may be opened and closed by the controller, and if desired proportionally, to ensure that the supply air is warmed only to a desired temperature in the optional further heat exchanger 24.

Various modifications may be made without departing from the scope of the invention. For example, although the invention has been described particularly for use with an oxygen concentration system 10 for an aircraft, the invention may be used for other gas systems and in other environments to an aircraft. Thus the gas supply 14 need not be hot and compressed air, but may be an ambient air supply although in this case, energy may be required to drive the turbine 20 and compressor 28 where provided.

Although it is preferred for there to be provided the further heat exchanger 24 to warm the dried air/gas as required, if desired an alternative means for warming the supply air/gas to an optimal temperature for use by the separating system 10 may be provided. For example, hot compressed gas from the gas supply 14 may be mixed with the dried supply gas, or used in a further heat exchanger to warm the supply gas instead of the compressed system air.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of providing gas to a system which separates from a pressurized supply gas, a product gas, the method comprising conditioning the supply gas by dividing the gas supply into system gas and supply gas, feeding the supply gas to a condenser where the supply gas is cooled by a coolant and moisture is removed from the supply gas to dry the supply gas, passing the system gas to a cooling device where the system gas is cooled, and using the cooled system gas as the coolant in the condenser and wherein the cooled system gas is compressed after using the cooled system gas as a coolant in the condenser, and is used in a heat exchanger to warm the supply gas after drying, to further condition the supply gas to bring the temperature of the supply gas to within a predetermined operating range for a downstream separation system.

2. A method according to claim 1 wherein the supply gas is cooled sufficiently to remove moisture from the supply gas by condensation.

3. A method according to claim 1 wherein the cooling device is a turbine over which the system gas is expanded.

4. A method according to claim 3 wherein the gas supply is hot highly pressurized gas and energy recovered from the hot pressurized gas by the turbine is utilized by the conditioning apparatus to drive a compressor to compress and warm the system gas after the system gas has been used as a coolant in the condenser.

5. A method according to claim 1 wherein the further conditioning of the supply gas comprises warming the supply gas with a warming fluid.

6. A method according to claim 5 wherein the gas supply is hot highly pressurized gas and energy recovered from the hot pressurized gas by the turbine is utilized by the conditioning apparatus to drive a compressor to compress and warm the system gas after the system gas has been used as a coolant in the condenser, and wherein the warming fluid is compressed system gas from the compressor driven by the turbine.

7. A method according to claim 1 which includes sensing the temperature of the supply gas downstream of the heat exchanger, to provide an input to a controller which opens and closes a valve in response, to control the flow of the warming fluid to the heat exchanger.

8. A method according to claim 1 further comprising exhausting the system gas from the heat exchanger.

9. A method according to claim 1 wherein the method includes utilizing ambient air as a coolant in a pre-cooler heat exchanger, to cool the gas supply prior to conditioning the supply gas.

10. A method of providing gas to a system which separates from a pressurized supply gas, a product gas, the method comprising conditioning the supply gas by both cooling and drying the gas, wherein the supply gas is cooled sufficiently to remove moisture from the supply gas by condensation, and wherein a gas supply is separated into system gas, and supply gas, and the supply gas is fed to a condenser where the supply gas is cooled by a coolant and moisture is removed from the supply gas to dry the supply gas, and the system gas is passed to a cooling device where the system gas is cooled, and then the cooled system gas is used as the coolant in the condenser.

11. A method according to claim 10 wherein the cooling device is a turbine over which the system gas is expanded.

12. A method according to claim 11 wherein the gas supply is hot highly pressurised gas and energy recovered from the hot pressurised gas by the turbine is utilised by the conditioning apparatus to drive a compressor to compress and warm the system gas after the system gas has been used as a coolant in the condenser.

13. A method according to claim 10 wherein the supply gas, after drying, is further conditioned in a heat exchanger to bring the temperature of the supply gas to within an optimal operating range for the downstream separating system.

14. A method according to claim 13 wherein the further conditioning includes warming the supply gas with a warming fluid.

15. A method according to claim 14 wherein the gas supply is hot highly pressurised gas and energy recovered from the hot pressurised gas by the turbine is utilised by the conditioning apparatus to drive a compressor to compress and warm the system gas after the system gas has been used as a coolant in the condenser, and wherein the warming fluid is compressed system gas from the compressor driven by the turbine.

16. A method according to claim 13 which includes sensing the temperature of the supply gas downstream of the heat exchanger, to provide an input to a controller which opens and closes a valve in response, to control the flow of the warming fluid to the heat exchanger.

17. A method according to claim 10 wherein the supply gas, after drying, is further conditioned in a heat exchanger to bring the temperature of the supply gas to within an optimal operating range for the downstream separating system the method including compressing the expanded system gas after using the expanded system gas as a coolant in the condenser, warming the supply gas after drying, in the heat exchanger with the compressed system gas, and then exhausting the system gas.

18. A method according to claim 10 wherein the method includes utilizing ambient air as a coolant in a pre-cooler heat exchanger, to cool the gas supply prior to conditioning the supply gas.

* * * * *